June 18, 1957 H. HARTMANN 2,796,458
ELECTRIC CONDUCTOR IN TUBULAR FORM FOR HIGH CURRENT DEVICES
Filed May 15, 1953

INVENTOR
Hans Hartmann
BY Pierce, Schiffler & Parker
ATTORNEYS

United States Patent Office 2,796,458
Patented June 18, 1957

2,796,458
ELECTRIC CONDUCTOR IN TUBULAR FORM FOR HIGH CURRENT DEVICES

Hans Hartmann, Baden, Switzerland, assignor to Aktiengesellschaft Brown, Boveri & Cie, Baden, Switzerland, a joint-stock company Application May 15, 1953, Serial No. 355,291

Claims priority, application Switzerland May 30, 1952

1 Claim. (Cl. 174—74)

The present invention relates to conductors and particularly those of the tubular type which are preferred in installations or equipment where high amperage currents are used and wherein the current flows substantially in the axial direction of the conductor.

With conductors of the above type it is often necessary to change the direction of the conductor in order to provide connections with other tubular conductors utilized in the device such as for example a high current transformer or choke of the kind used with a current converter of the mechanical switching type, or to provide interconnections between tubular conductors of interrelated electric apparatus such as between a transformer and a current converter or between a transformer and an electrolytic bath.

The object of this invention is to provide an improved construction for a tubular conductor which facilitates connections thereto and the objective is attained by providing a flange on the conductor in which the direction of current flow is changed from axial along the straight portion of the conductor surface to substantially radial in the flange.

The construction according to the invention affords the advantage, apart from the favorable current conduction characteristic inherent in tubular conductors, of an unconstrained change in the direction of current flow, and also provides a most convenient means for connection of a high voltage apparatus to the current consumer. The magnetic field in the flange carrying current in the radial direction becomes zero on the side away from the current lead.

The foregoing objects and advantages will become more apparent from the following detailed description of preferred conductor constructions embodying the inventive concept defined in the appended claim when considered with the accompanying drawings.

Figure 1:
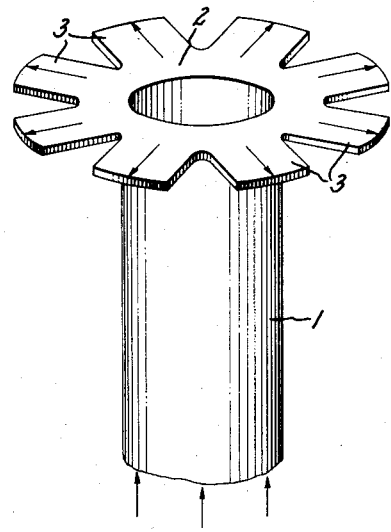

Fig. 1 of the drawings illustrates an application of the invention to a single tubular conductor shown in perspective, and wherein the flange formed thereon is notched inwardly from the periphery thereof to establish a plurality of radially extending ears or tabs.

Figure 3:
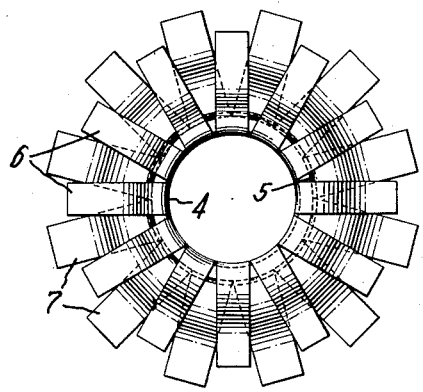
Figure 2:
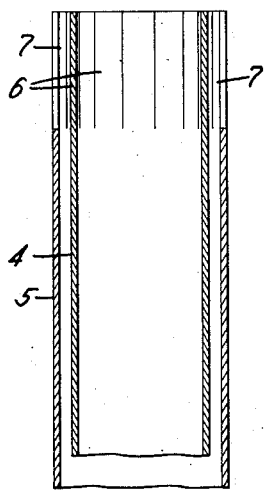
Figure 4:
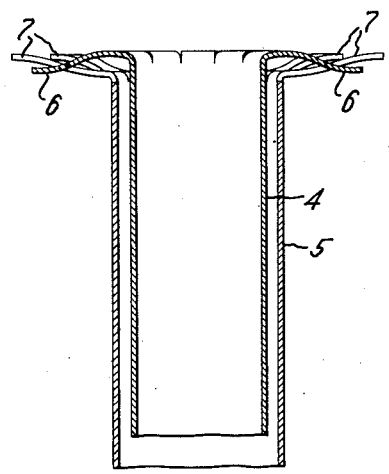

Figs. 2-4 illustrate a different embodiment wherein the radially extending tabs are formed on each of a pair of concentric tubular conductors by slitting the conductors inwardly from the end to form tabs and then turning the tabs downward and outward. Fig. 2, a vertical central section, shows the tubular conductor after slitting but before the tabs are turned; Fig. 3 is a top plan view of the conductor ends after turning the tabs; and Fig. 4 is a vertical central section of the conductors after the tabs are turned.

With reference now to Fig. 1, the numeral 1 indicates the end of a tubular conductor which may for example be part of the winding of a transformer having an annular iron core carrying the primary winding and which is surrounded by a secondary winding none of which has been illustrated. In accordance with the invention, a flat flange 2 is formed upon the end of conductor 1 and the plane of the flange is preferably perpendicular to the axis of the conductor. To establish various connecting points to the conductor, the periphery of the flange is notched to provide a plurality of circumferentially spaced and radially extending connection tabs or ears 3 of any desired configuration which each constitutes a terminal for connection to associated equipment. The direction of current flow in the conductor 1 is longitudinally thereof and in the flange 2 the current direction is radial, as indicated by the arrows.

In the modification shown in Figs. 2-4, it will be seen that there are two conductors 4, 5 one concentrically within the other and that each of these conductors is first slitted longitudinally inward from the end as shown in Fig. 2 to form a plurality of tabs 6, 7 respectively. Tabs 6 on conductor 4 and tabs 7 on conductor 5 are both axially and circumferentially displaced as shown in Figs. 3, 4 such that when bent over to lie in surfaces of revolution each defined by a reversely curved generatrix line they extend in substantially radial directions, the tabs 6 will lie in the spaces between tabs 7 to facilitate connections thereto.

In conclusion it is to be understood that the invention is not limited to the particular constructions shown and described since variations which may occur to those familiar with the art fall within the spirit and scope of the invention as set forth in the appended claim.

I claim:

Concentric tubular conductors for high current installations wherein the currents flow respectively therein in axial directions along each conductor, each said conductor being provided with a tabbed flange, the tabs of one flange being both axially and circumferentially displaced from the tabs of the other flange to position the tabs of each flange in the spaces between the tabs of the other flange.

References Cited in the file of this patent

UNITED STATES PATENTS

| | | |
|---|---|---|
| 1,981,753 | Pearson | Nov. 20, 1934 |
| 2,477,849 | Adams | Aug. 2, 1949 |
| 2,644,929 | Kumpf | July 7, 1953 |
| 2,748,368 | Gookin | May 29, 1956 |